Nov. 16, 1926.
J. J. SCHULTZ
1,607,019
AUTOMOBILE SIGNAL
Filed June 15, 1925    3 Sheets-Sheet 1
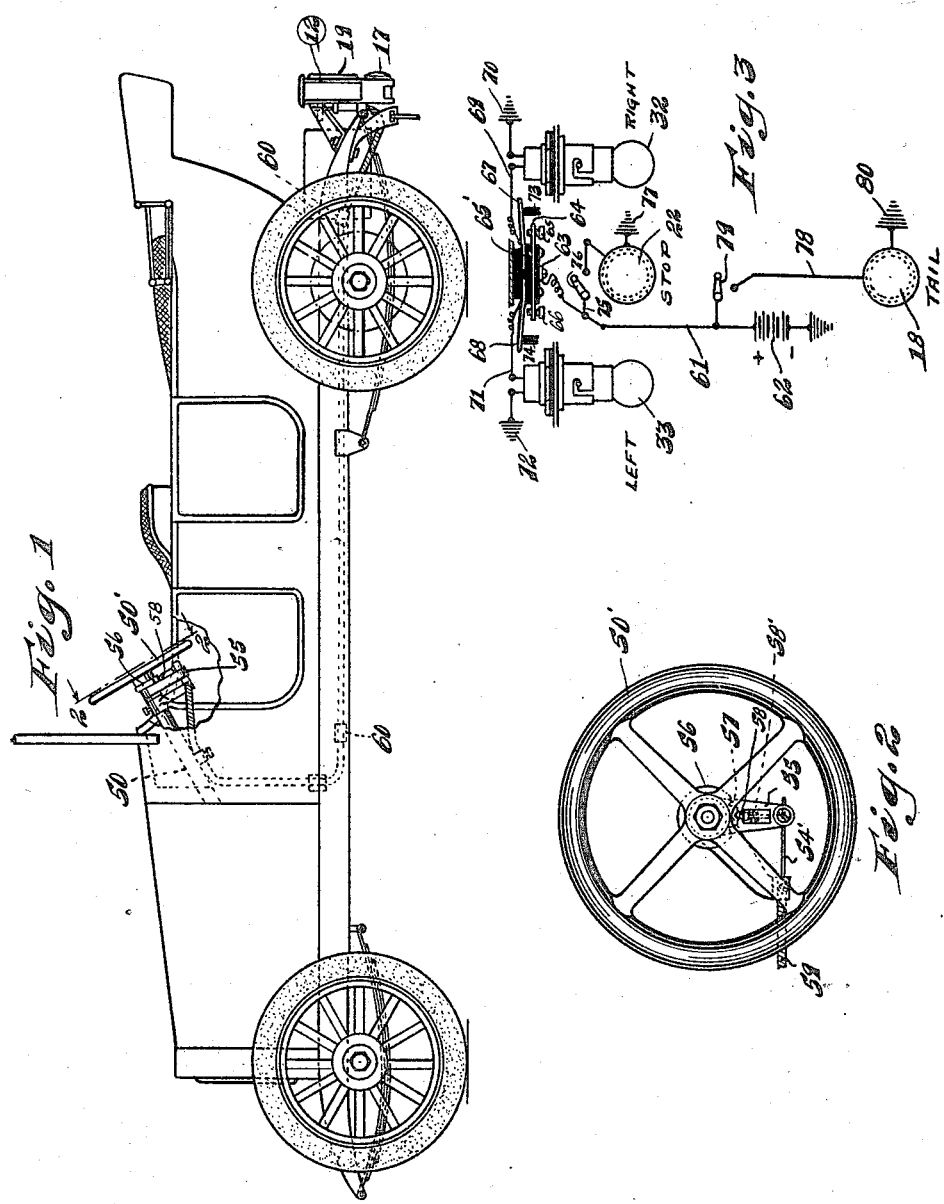

Nov. 16, 1926.
J. J. SCHULTZ
AUTOMOBILE SIGNAL
Filed June 15, 1925
1,607,019
3 Sheets-Sheet 2
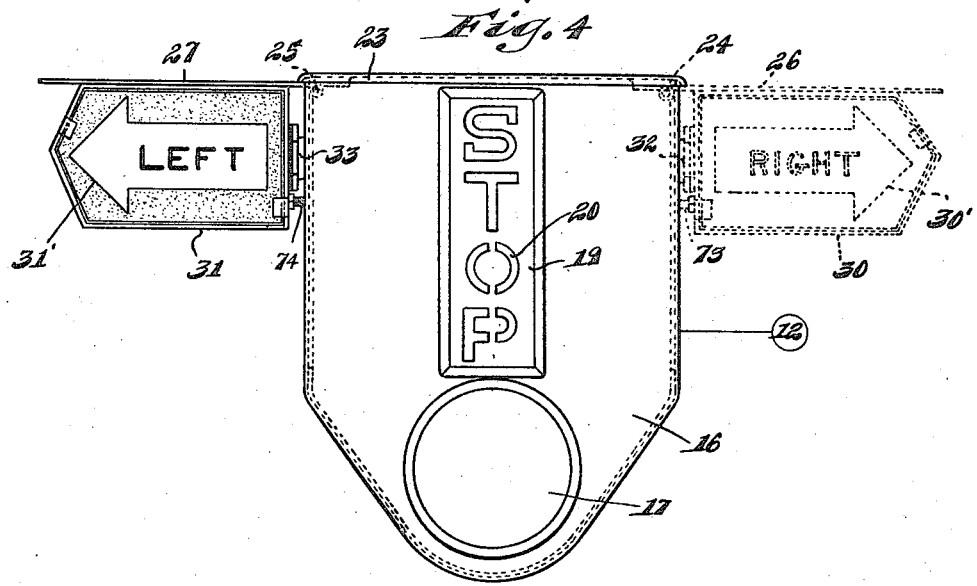
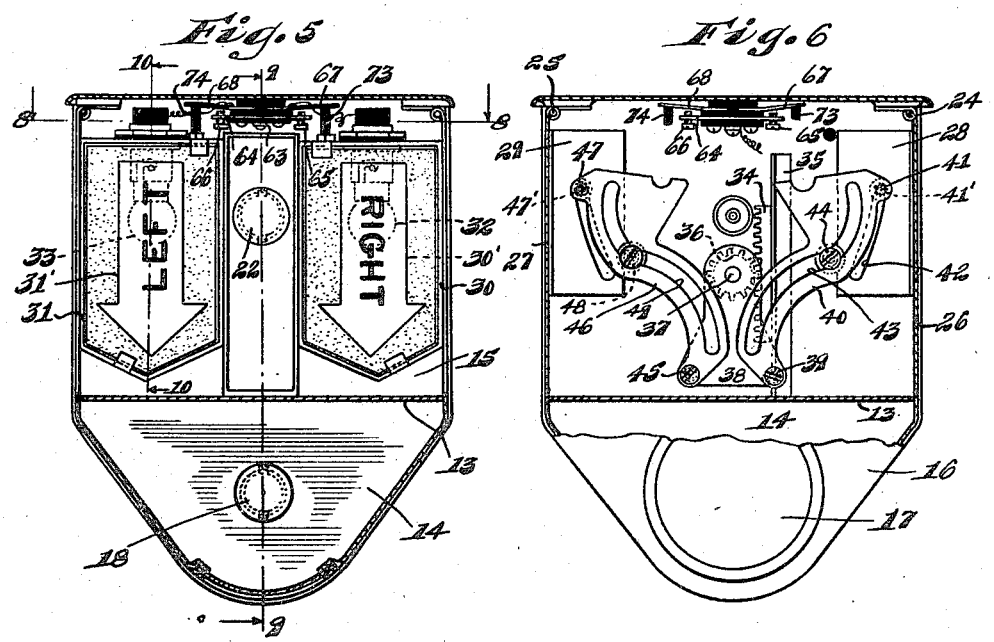
Witnesses:
Inventor:
John J. Schultz,
By Joshua R. Horr
his Attorney.

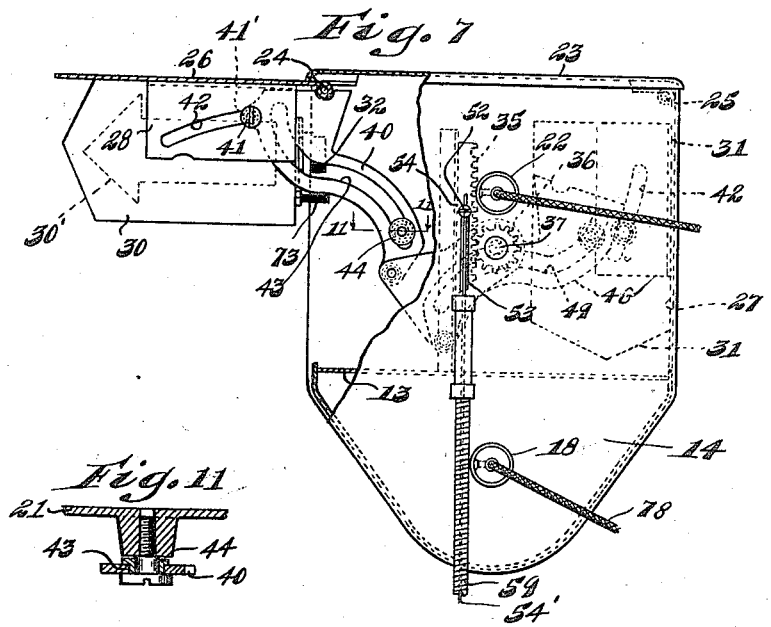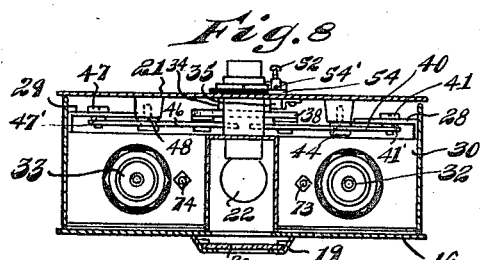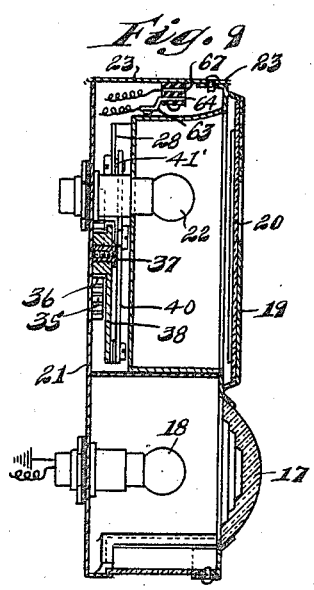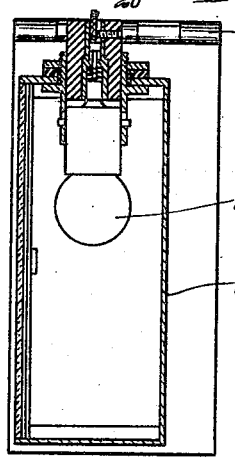

Patented Nov. 16, 1926.

1,607,019

UNITED STATES PATENT OFFICE.

JOHN J. SCHULTZ, OF CHICAGO, ILLINOIS.

AUTOMOBILE SIGNAL.

Application filed June 15, 1925. Serial No. 37,150.

My present invention relates to automobile signals, adapted to afford means whereby the driver may signal either by day or by night when he is about to change the running action of the vehicle, and my invention has for its principal object the provision of an improved device of the character indicated, which will be simple in construction, easy of operation and highly efficient in use.

Other objects will appear hereinafter.

The invention consists in the combinations and arrangements of parts hereinafter described and claimed.

The invention will be best understood by reference to the accompanying drawings, forming a part of this specification, and in which—

Fig. 1 represents a side elevational view of an automobile, showing my improved signal together with means for operating the same, applied thereto;

Fig. 2 represents a detail of the steering wheel, taken on the line 2—2 of Fig. 1, and showing the means employed for manually operating the signal;

Fig. 3 is a diagram of the wiring connections for the glow lamps carried by the signal;

Fig. 4 is a rear elevational view of the signal, showing the "left" signal arm extended and showing also in broken lines the "right" signal arm as it appears when extended;

Fig. 5 is a rear elevational view of the signal with the rear cover plate removed;

Fig. 6 is another rear elevational view with the rear cover partly broken away and with the "right" and "left" signal compartments removed to show the internal working parts;

Fig. 7 is a front elevational view of the signal showing the "right" signal extended and part of the front casing broken away;

Fig. 8 represents a horizontal cross section taken approximately on the line 8—8 of Fig. 5;

Fig. 9 represents a central vertical section taken on the line 9—9 of Fig. 5;

Fig. 10 is a sectional detail view through a signal compartment taken approximately on the line 10—10 of Fig. 5; and Fig. 11 is a cross section taken on the line 11—11 of Fig. 7.

The preferred embodiment of my invention as exemplified in the accompanying drawings, comprises a suitable signal casing 12, divided by a horizontally-disposed partition 13 into a tail-lamp compartment 14 and a signal arm compartment 15, the opposed sides of the signal compartment being open. The casing is provided with a removable rear cover 16 provided with the usual tail-lamp lens 17 for the tail-lamp 18 located in the tail-lamp compartment 14. Above the lens 17, the rear cover is also provided with a central vertically extending raised portion 19 provided with stenciled letters spelling the word "Stop," said raised portion 19 carrying on the inner side thereof a translucent glass plate 20, which in practice is suitably colored. Suitably attached to the inner face of the front plate 21 is a stop-lamp 22 which illuminates the letters spelling the word "Stop."

Hinged to the top plate 23 at 24 and 25 are signal arms 26 and 27, respectively. These arms are made in the form of side plates to serve as closures for the open opposed sides of the casing above the horizontal partition 13. Projecting at right angles from the signal arms 26 and 27 are lever-plates 28 and 29, respectively. Secured to the signal arms 26 and 27 are "right" and "left" signal compartments 30 and 31, respectively; the "right" signal compartment having a suitable translucent face bearing an arrow head 30' containing the word "Right" while the signal compartment 31 is similarly provided with an arrow head 31' with the word "Left." The signal compartment 30 and 31 are of such size as to suitably fit within the main signal compartment 15 when the arms 26 and 27 are moved into position to serve as closures for the sides of the casing. The right signal compartment 30 carries a glow-lamp 32 for illuminating the "right" arrow while the signal compartment 31 carries a glow-lamp 33 for the illumination of the "left" arrow.

We now come to the means located in the main signal compartment 15 for elevating or raising the signal arms. This means, in the exemplification shown, comprises a rack bar 34 mounted for vertical sliding movement adjacent the front cover 21 and upon a guide 35 secured thereto. Meshing with the rack bar 34 is a gear 36 operative on a short shaft 37 and carrying a tumbler 38. Pivoted at one end to one corner of the tumbler at 39 is a curved arm 40 whose upper end is pivoted at 41 to a roller guide 41' movable in a slot 42 in the lever-plate 28. The curved lever 40 is provided with a curved slot 43 in which is a roller guide 44 carried by the front plate. The left lever plate 29 is operatively connected in a similar manner with the tumbler 38; the specific connections comprising a pivot 45 connecting the curved arm 46 with the tumbler, a pivot 47 connecting the roller guide 47' with the curved arm, and a roller guide 48 working in the slot 49 of the curved arm. When, under this arrangement, the signal compartments 30 and 31 are housed within the main compartment 15 as best illustrated in Fig. 6, the gear 36 is in mesh with the rack bar approximately midway the length thereof, which position may be referred to as the "neutral" position. When the rack bar is moved upwardly from the neutral position, the right signal arm 26 will be extended; and similarly when the rack bar is moved downwardly from neutral the left signal arm 27 will be extended. Moreover, it may be explained here, that when the signal arm 26 is extended, the tumbler 38 moves towards the right, whereas, when the signal arm 27 is extended the said tumbler moves towards the left. These specific movements are made possible by reason of the slotted arms 40 and 46 having movement upon the respective roller guides 44 and 48; and further by reason of the roller guides 41' and 47' having movement in the respective lever plates 28 and 29. Moreover, in this connection, it will be understood that under this arrangement of parts, the right signal arm 26 is locked against extension during the operation of the left signal arm 27, and vice versa.

The rack bar 34 is preferably actuated by manually operated mechanism located on the steering column 50 below the steering wheel 50'. In the embodiment shown, this means comprises a pin 52 which moves in a vertically extending slot 53 provided in the front plate 21. Said pin 52 is suitably mounted in a guide or carrier 54 which slidably engages the edges of the slot 53. Attached to the pin 52 is a cable 54' which reaches to a lever 55 swingably mounted on the steering column (Figs. 1 and 2). Fixed upon the steering column is a bracket 56 of curved form wherein three notches as 57 are provided. The central notch 57 represents the "neutral" position for the rack bar 34 when the signal arms 26 and 27 are in non-signaling position within the casing. The lever 55 carries a pointed pin 58 which is normally urged into position for engagement with the notches by a push spring 58' imprisoned within the lever. When, therefore, under this arrangement, the pin 58 is engaged with the "neutral" notch both of the signal arms will be within the casing. When said pin is moved into the notch to the right of neutral the right signal arm 26 will be elevated; and when said pin is moved into the notch at the left of neutral the left signal arm 27 will be elevated to signaling position. The cable 54', as herein shown, is taken through a flexible tube 59, suitably supported upon guides as 60 secured to the chassis of the automobile.

Referring to the wiring connections (Fig. 3) for the glow-lamps within the casing, 61 is a conductor which leads from a battery 62 or other suitable source of energy to a binding terminal 63 connected with a plate conductor 64 mounted in an insulation block 65' on the inner face of the casing top 23. Plate conductor 64 carries right and left adjustable conductors 65 and 66. Also mounted in the insulation block 65' are right and left spring switches 67 and 68, respectively, such spring switches being normally in engagement with the respective screws 65 and 66. The right spring switch 67 is connected with one terminal of the glow-lamp 32 through a conductor 69. The opposite side of this lamp is grounded at 70. In a similar manner, the spring switch 68 is in electrical connection with one side of the glow-lamp 33 through a conductor 71, which said lamp is grounded at 72. Now, it will be observed, that the right signal compartment 30 carries a contact post 73 of insulation material, adapted when the right signal arm is closed to impinge the spring switch 67 and disengage the same from the screw 65. Whenever, therefore, the right signal is in non-signaling position the circuit through the glow-lamp 32 is broken. The left signal compartment 31 also carries a similar contact 74 adapted, in a similar manner, when the left signal is in non-signaling position to impinge upon the spring switch 68 and disengage the same from the screw 66 thereby breaking the circuit through the glow-lamp 33. In this manner, I provide an arrangement of parts which, in effect, constitutes a circuit breaker, adapted to break the electrical circuit through the individual glow-lamps 32 and 33 when the signal arms carrying the same are in non-signaling position. The stop lamp 18 is connected with supply line 61 through a conductor 75 in which is incorporated a suitable switch 76. The glow-lamp 22 is grounded at 77. The tail-lamp 18 is connected electrically with the supply line 61 through a conductor 78 in which is incorporated a suitable switch 79. This glow-lamp 18 is grounded at 80.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. An automobile signal including a casing; right and left signal compartments pivoted thereon; a rack bar movably arranged within the casing; means controlled by the rack bar controlling the operation of each of said signal compartments and comprising a tumbler geared at one end to the rack bar; and a separate operative connection between the free end of the tumbler and each of the signal compartments, substantially as described.

2. An automobile signal including a casing; right and left signal compartments pivoted thereon; a rack bar movably arranged within the casing; a tumbler pivoted at one end in the casing and geared at that end to the rack bar; a separate lever connection between the free end of the tumbler and each signal compartment; the connections between the lever connections and their respective signal compartments consisting of slots and roller guides working in the slots, substantially as described.

3. An automobile signal including a casing; right and left signal compartments pivoted thereon; a rack bar movably arranged within the casing; a tumbler pivoted at one end in the casing and geared at that end to the rack bar; a separate lever connection between the free end of the tumbler and each signal compartment; the connections between the lever connections and their respective signal compartments consisting of slots and roller guides working in the slots; said lever connections being slotted lengthwise; and roller guides on the casing working in said lengthwise slots, substantially as described.

4. An automobile signal including a casing; a pair of signal compartments hinged thereon at their top ends for independent movement into elevated position; a tumbler control mounted at one end to swing on a pivot; and an operative lever for each of the signal compartments mounted between its ends for pivoting and sliding movement, each of the operative levers having one end thereof separately pivoted to the free end of the tumbler and having the other end thereof connected for pivoting and sliding movement with its respective signal compartment, substantially as described.

5. An automobile signal including a casing; a pair of signal arms pivoted to the casing; a rack bar movably mounted within the casing; a gear in mesh with said rack bar and carrying a tumbler; and a separate operative connection between the tumbler and each of the signal arms comprising a lever arranged to move on a roller guide and having pivotal connection at one end with the tumbler and a roller guide and slot connection at the other end with its corresponding signal arm, substantially as described.

6. In an automobile signal, the combination with a casing, of a signal arm hinged thereto; a rack bar movably mounted in the casing; a gear meshing with said rack bar; a tumbler fast with said gear; and an operative connection between said tumbler and said signal arm, substantially as described.

7. In an automobile signal, the combination with a casing, of a signal arm hinged thereto; a rack bar movably mounted in the casing; a gear in the casing meshing with said rack bar and carrying a tumbler; a curved arm pivotally connecting said tumbler with said signal arm; and a guide in the casing for said curved arm, substantially as described.

8. In an automobile signal, the combination with a casing provided with slot, of a rack bar movably mounted in the casing; a pin on the rack bar extending through said slot; a gear meshing with said rack bar; a tumbler fast with said gear; a signal arm and an operative connection between said tumbler and said signal arm; and means attached to said pin exteriorly of the casing for actuating said rack bar, substantially as described.

9. In an automobile signal, the combination of a casing, of right and left signal arms hinged thereto; a rack bar movably mounted in the casing; a gear meshing with said rack bar; a tumbler fast with said gear; and separate operative connections between said tumbler and said right and left signal arms, substantially as described.

In testimony whereof I have signed my name to this specification.

JOHN J. SCHULTZ.